United States Patent [19]

Grant, Jr.

[11] 4,000,947
[45] Jan. 4, 1977

[54] OPTICAL READOUT FOR DIFFERENTIAL LASER GYROS

[75] Inventor: David C. Grant, Jr., Simsbury, Conn.

[73] Assignee: United Technologies Corporation, Hartford, Conn.

[22] Filed: May 27, 1975

[21] Appl. No.: 580,660

[52] U.S. Cl. .................... 356/106 LR; 331/94.5 C
[51] Int. Cl.² ...................... G01B 9/02; H01S 3/00
[58] Field of Search ......... 356/106 LR; 331/94.5 C

[56] References Cited
UNITED STATES PATENTS 3,862,803   1/1975   Yntema et al. .............. 356/106 LR

*Primary Examiner*—Vincent P. McGraw
*Attorney, Agent, or Firm*—Donald F. Bradley

[57] ABSTRACT

In a differential laser gyro system including a ring laser in the form of a figure eight incorporated in a solid block, optical readout is accomplished by mounting the readout optics to the block in a manner similar to that employed for the laser optics. The laser optics comprises four mirrors mounted on the outer face of the block, with diagonally opposite faces being parallel. A modulator having plane parallel end faces is incorporated in the laser optical system, and oriented so that readout reflections therefrom occur in a plane at a slight angle to the lasing plane. Readout beam director prisms are positioned on the outer faces of the block adjacent to the laser optic system mirrors, and direct the readout reflections to a beam splitter and then to optical detectors as in conventional readout optical systems. Alignment of the readout system is enhanced by virtue of the fact that both angular and linear adjustments can be made by rotating or translating the readout optics. By virtue of the mounting of the beam splitter on a spherical base, angular adjustment of the beam splitter is provided to assure colinearity of the readout beams at the optical detectors.

9 Claims, 3 Drawing Figures

OPTICAL READOUT FOR DIFFERENTIAL LASER GYROS

The invention herein described was made in the course of or under a contract or subcontract thereunder with the Department of the Navy.

BACKGROUND OF THE INVENTION

1. Field of the Invention

This invention relates to differential laser gyros, and particularly to a ring laser configuration in which readout of the laser signals is accomplished by an optical system fixedly mounted on the outside of the block which contains the ring laser. Stability and accuracy of the readout as well as ease of alignment of the readout system is enhanced.

2. Description of the Prior Art

Ring type lasers, employing electromagnetic traveling waves at optical frequencies in a clockwise and anticlockwise direction about a closed path in a principal plane, have been utilized to sense rates of angular rotation in a manner similar in function to the electromechanical gyro. When the laser gyro is physically rotated, more time is required for a traveling wave to complete the optical path in the direction of rotation, and less time is required for a traveling wave to complete the optical path in the direction opposite to the direction of rotation. Thus, if the laser is rotating in the same direction as the clockwise beam, the frequency of the clockwise beam will appear to be less than the natural frequency of the laser, whereas the frequency of the anticlockwise beam will seem to be higher. The difference the two frequencies is a function of the rate of rotation of the gyro.

The two mode laser gyro as described heretofore must be biased to prevent locking between the two optical frequencies at low angular rates. The differential laser gyro comprises two such two mode gyros in the same cavity, biased by the same element but in an opposite sense with respect to rate. When the differential output between the two gyros is measured, rate output is additive resulting in doubled sensitivity with first order bias cancellation. A differential laser gyro system of this type is given the acronym DILAG, and is described in commonly owned U.S. Pat. No. 3,862,803 to which reference may be made for details of the DILAG.

A source of error encountered in the prior art is the optical readout from the laser gyro. Since the gyro operates on the differences in optical frequencies between two pairs of oppositely rotating beams, and since the pairs of beams are of different polarizations and are colinear in their lasing path, it is necessary to extract from the lasing path a portion of each beam and to combine similarly polarized portions of the two beams in a manner that will retain the desired information without at the same time introducing errors in the output. A particular difficulty which occurs is that a right circularly polarized beam becomes left circularly polarized, and vice versa, upon reflection from a mirror, resulting in complexities in designing an accurate readout system.

One prior art approach to obtaining readout from the gyros uses the reflections from the angularly disposed faces of a wedge shaped modulator, the two reflected beams being directed by mirrors disposed on posts within the ring gyro block, combined in a beam splitter and thereupon directed to two separate detectors, one detector responding to the clockwise gyro frequency and the other detector responding to the anticlockwise gyro frequency. This approach, while adequate, is subject to errors introduced by mechanical and thermal instability of the post mounted mirrors. Differential motion of any mirror or beam director, and including the beam splitter which combines the beams, produces a doppler shift in the beam frequency which is seen at the output as a rate signal, and is a source of error. Any angular misalignment between the two beams produces an amplitude change at the detector which also produces a frequency shift in the output and is another source of error. An additional error is produced by any strain, misalignment, or other thermal, mechanical or electromagnetic effect which introduces polarization anisotropies differentially into the beams, causing cross talk between the two gyro signals.

In order to properly align the readout beams to intersect at the beam splitter, it is necessary to mount the reflecting mirrors on mounting devices having one or more degrees of angular freedom, and in some cases having at least one degree of translational freedom, while the beam splitter itself required freedom about two axes, the mechanical mountings adding to the instability of the system in response to mechanical shock or thermal distortion. In the prior art the reflected readout beams are propagated in the same plane but slightly removed from the path of the propagating laser waves, and the readout optics are constrained in location in order to prevent undesired interaction between the reflected readout beams and the laser gyro itself.

SUMMARY OF THE INVENTION

The primary object of the present invention is an improved readout optical system for a DILAG in which the readout optics are firmly mounted to the ring laser block to thereby reduce errors caused by thermal expansion and mechanical shock of the block. Alignment of the readout optics is also enhanced by the unique design of the readout optics.

In accordance with the present invention, the DILAG consists of a ring laser in a figure eight configuration formed in a block such as quartz. The ring laser design requires four mirrors which are fixedly attached to the sides of the block, diagonally opposite mirrors being mounted parallel to each other for ease of assembly and alignment of the laser gyro as is disclosed and claimed in commonly owned copending application Ser. No. 580,846 entitled "Differential Laser Gyro Mirror Mount System" filed on even date herewith. The modulator element in the lasing path is configured to have plane parallel end faces and is rotated so that the reflections from each end thereof occur in a plane at a slight angle to the plane of the laser beam. The reflections are directed so that they are slightly separated from the plane of the laser beam and intersect a prism mounted on the DILAG block immediately adjacent to the laser beam reflecting mirrors. The prisms, one for clockwise laser beam reflections and the other for anticlockwise laser beam reflections, direct the reflected beams in a common plane toward a beam splitter located in the center of the DILAG block where the two reflected beams intersect. Detectors are positioned on the DILAG block to produce a readout from each of the oppositely polarized ring lasers. The clockwise and anticlockwise components of each gyro readout beam must be colinear prior to their intersecting the detector surface so that the phase fronts interfere across the entire detector surface. The prisms are thus positioned to cause the beams to coincide at the beam splitter plane, and the beam splitter is then adjusted to cause the transmitted portion of one beam to be colinear with the reflected component of the other beam. By mounting the readout prisms on the block itself, improved stability is produced, and the prisms can be both rotated and translated to align the readout optics without disturbing the lasing mirrors.

The present invention eliminates the use of metallic mounts entirely and employs optics which are mounted directly on the basic block in such a manner that except for nonuniformities in the optics themselves or in the block, all errors due to thermal expansion are cancelled, and errors due to mechanical effects are reduced to the limit of the block material.

In further accord with the present invention, the beam splitter is mounted to a polished spherical base which in turn sits in a matching polished spherical seat machined into the DILAG block. The improved mounting provides three degrees of angular adjustment which permits the coincident reflected beams to be made colinear after leaving the beam splitter surfaces.

Although the present invention is described with respect to a figure eight DILAG configuration, it applies as well to other DILAG geometric configurations such as square, rectangular or any other convenient shape.

The foregoing and other objects, features and advantages of the present invention will become more apparent in the light of the following detailed description of preferred embodiments thereof, as illustrated in the accompanying drawings.

DESCRIPTION OF THE PREFERRED EMBODIMENT

Figure 1:
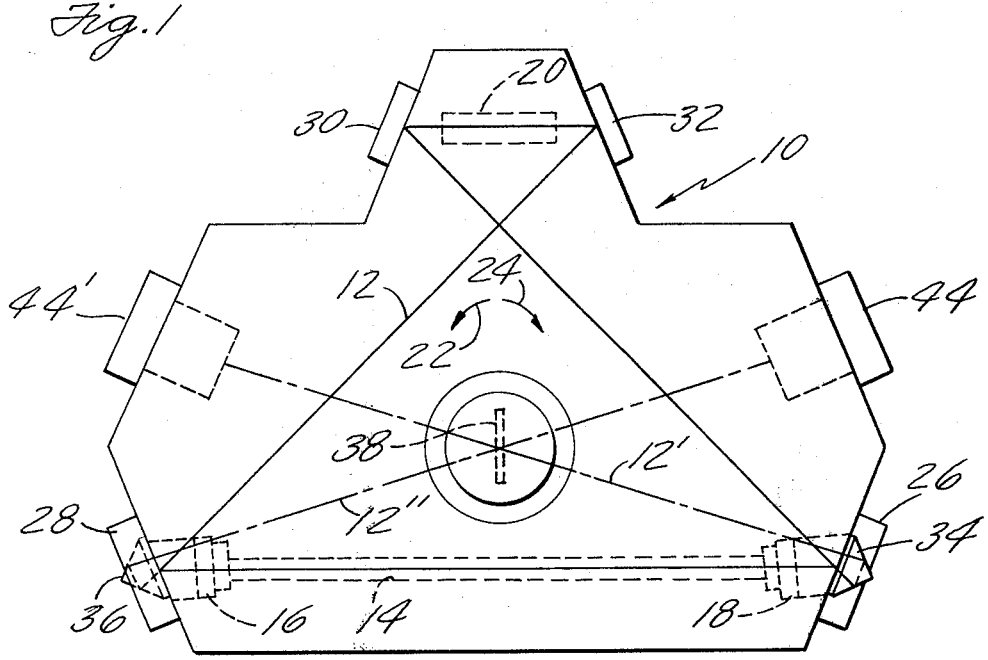
FIG. 1 is a simplified schematic diagram of a figure eight DILAG assembly showing the details of the readout optics.

Referring to FIG. 1, there is shown a laser gyro assembly in a delta or figure eight ring configuration. The laser gyro is mounted in a block 10 which is a solid material such as quartz or ULE and which may be transparent. A series of narrow passages, not shown, are formed in the block 10 such as by drilling, the passages forming the path for the traveling laser beam as illustrated by the solid line 12. The traveling laser beam lies in a single plane. Contained in one of the passages is a laser gain tube 14 with transparent windows 16 and 18 at the ends thereof, the windows preferably being wedge shaped to reduce reflections therefrom. A windowless integral gain bore may also be used. As is known in the art, a gas such as HeNe is enclosed within the passages at a low pressure, for example between 1 and 5 torr, and suitable electrodes inserted in the gain tube 14 to produce a discharge in the gas. The manner of producing the laser discharge is well known and will not be described in detail.

A modulator element 20 having plane parallel end faces is positioned in one of the passages in the path of the traveling laser waves to produce the polarization and directional anisotropy which results in clockwise and anticlockwise rotating waves at different polarizations, the rotating waves being separated in frequency. The arrows 22 and 24 show the direction of the anticlockwise (A) and clockwise (C) waves respectively in the direction in which they travel through the gain tube 14.

To produce the traveling laser waves, mirrors 26, 28, 30 and 32 are mounted on the outside of the block 10. The clockwise wave leaves gain tube 14 and is reflected in turn from mirrors 28 and 32, passes through modulator element 20, and is then reflected from mirrors 30 and 26 back into the gain tube. The anticlockwise wave is reversed in its path about the system. For ease in alignment of the laser discharge optical system, diagonally opposite mirrors are mounted on seats that are machined parallel to each other, i.e., the seats for mirrors 28 and 32 are machined parallel to each other, and the seats for mirrors 26 and 30 are machined parallel to each other. As described in detail in copending application Ser. No. 580,846, by making diagonally opposite mirror mounting seats parallel, the requirement for manually and independently aligning each of the mirror seats is eliminated resulting in considerably reduced tolerances on the manufacture of the laser block. The resultant parallelism of the diagonally opposite mirrors enables simplification and refinement of the optical readout system as disclosed herein.

Figure 2:
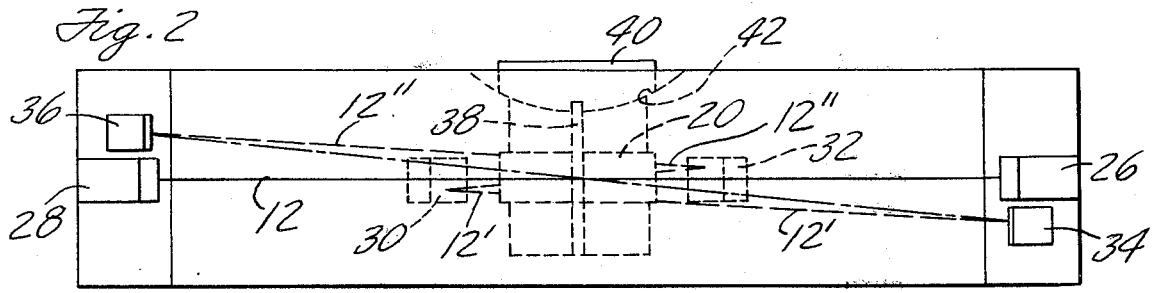
FIG. 2 is a bottom projection of the DILAG assembly of FIG. 1 illustrating the beam splitter mounting assembly.
Figure 3:
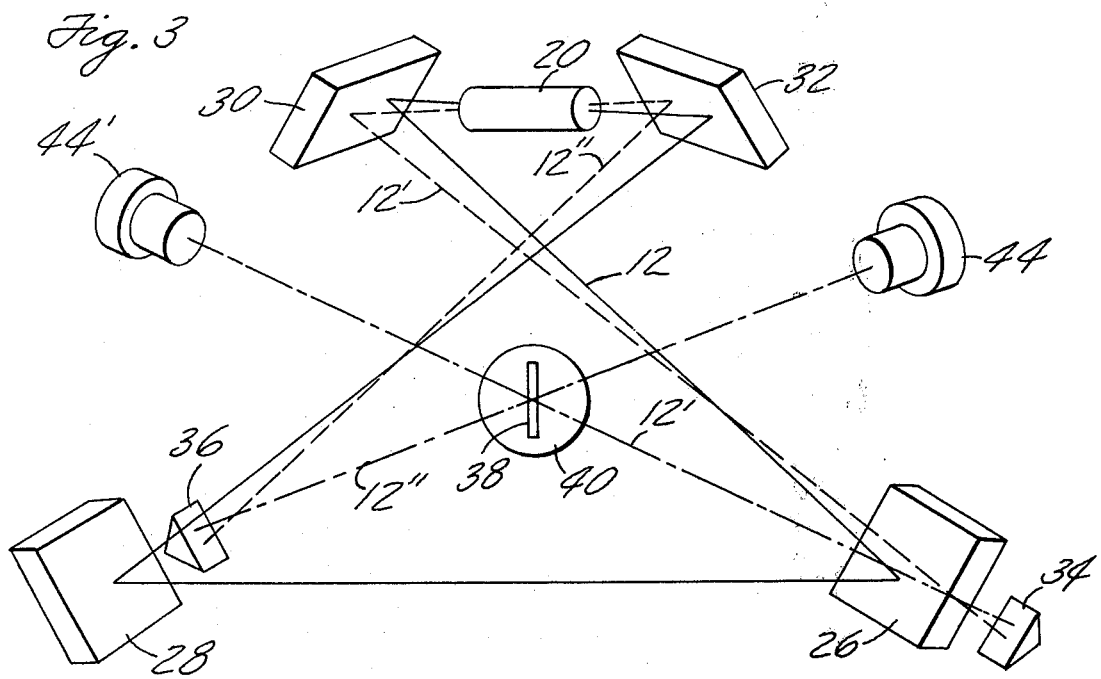
FIG. 3 is a perspective view of the DILAG assembly of FIG. 1 illustrating the path of the propagating beams in the readout system.

To accomplish the improved optical readout system, it is required that the modulator element 20 having plane parallel end faces be oriented so that the reflections therefrom, a small but useful percentage of the laser radiation incident thereon, are reflected at a small angle from the plane of the laser radiation with a component normal to the lasing plane. As shown best in FIG. 3, modulator element 20 is so oriented that a portion of the anticlockwise traveling wave is reflected from the left-hand end of modulator element 20 as shown by the dotted line 12' at a slight angle such as 4.5° relative to the traveling laser beam 12, strikes mirror 30, and is reflected therefrom toward a prism 34 mounted on the side of block 10 immediately adjacent mirror 26. The reflected beam 12' is directed by the prism 34 toward a beam splitter 38 mounted in a spherical base 40 which in turn sits in a matching spherical seat 42 machined into block 10. The details of the mounting assembly for the beam splitter are shown best in FIG. 2. Likewise, a portion of the clockwise traveling wave is reflected from the right-hand end of modulator element 20 as shown by the dotted line 12'' at a slight angle to the traveling laser beam 12 but opposite that of beam 12', strikes mirror 32, and is reflected therefrom toward a prism 36 mounted on the side of block 10 immediately adjacent mirror 28. The reflected beam 12'' is directed by the prism 36 toward beam splitter 38. Reflected beams 12' and 12'' intersect each other at beam splitter 38, a portion of each beam 12' and 12'' being reflected and/or passing through the beam splitter 38 to impinge on detectors 44 and 44' positioned on block 10 in the path of the reflected beams. The use of the beam splitter 38 and detectors 44 and 44' for producing a differential readout is well known and does not form a part of the present invention.

Only first surface reflections are shown in the figures for simplicity, second surface reflections being parallel to the first surface reflections and displaced therefrom by one of two beam diameters depending on the face angle of the reflecting surfaces. Displacement of the second surface reflections is best accomplished by providing suitable thickness to the optical components.

At mirrors 30 and 32 the readout beams 12' and 12" are sufficiently separated from the circulating laser beam 12 that they will not intersect mirrors 26 and 28 respectively and can be picked up in the clear apertures of prisms 34 and 36. The prisms are identical internal reflecting prisms which direct the reflected beams into a common plane. Each prism is surface mounted, and by rotation and/or translation, readout beam angle and position may be varied so that both beams 12' and 12" are coplanar and coincident on the beam splitter surface.

The beam splitter 38 is mounted in any known manner to the spherical base 40, and by virtue of the spherical seat 42 (FIG. 2) 3° of angular adjustment are provided to the beam splitter, thereby permitting easy adjustment of the beam splitter to permit the incident beams to strike the detectors colinearly. As with the prisms and mirrors, once aligned the beam splitter mount is locked in place by optical contacting or other known techniques to prevent further motion. The beam splitter mount is preferably recessed into the block 10 so that translation effects of the beam splitter may be eliminated. The mount is also preferably made of the same material as the block 10. Epoxy may be used around the outside of the beam splitter mount 40 if necessary.

After leaving the beam splitter, the colinear reflected and refracted beams may be passed through a window, not shown, and intersect the detector assemblies 44, 44' which must be positioned to provide maximum response with minimum backscatter. Typical detectors are models TIXL47 or equivalent. Depending on the precise design of the prisms, it may be necessary to maintain the beam splitter 38 at a slight angle to provide colinear output beams.

Polarization vector orientation in the readout optical system is provided by polarization analyzers, not shown, to separate the two differently polarized gyro components, e.g., quarter wave plates and linear polarizers are appropriately positioned in the readout system path to accomplish the separation of the two differently polarized gyro outputs.

The mounting of the readout optics as described with respect to the present invention minimizes the variations in alignment and relative movement of the readout components to those variations to which the lasing cavity optics are subject. Prior art systems contain independent error sources in the readout optics due to the lack of rigidity in the mounting of the readout optics relative to the lasing cavity optics.

The present invention reduces optic errors to the limit of the block material itself in terms of its stiffness under shock, vibration of g-loading. First order thermal expansion, if it is uniform, is cancelled by the symmetric arrangement of the readout optics. If the block 10 is made of a material with a very low coefficient of expansion such as ULE or CERVIT, then a transient thermal gradient will produce errors which depend on its magnitude and location. However, the magnitude of the error will be in proportion to the linear coefficient of expansion, which in present designs is of the order of $20 \times 10^{-6}$ Δ $l/1°$ C, while with the present invention it is in the order of $3 \times 10^{-8}$ Δ $l/1°$ C or nearly three orders of magnitude lower.

The invention is not limited to the embodiments described hereinbefore, but is applicable to modifications thereof which will be readily apparent to those skilled in the art. For example, the modulator element 20 may be wedge shaped, in which case rotation thereof will produce both readout beams, 12' and 12", on the same side, i.e., both beams are in front of or in back of the plane of the circulating laser beam. Likewise the DILAG configuration need not be figure eight, but may be rectangular or another geometric shape, as long as the shape is sufficiently symmetrical to permit coincidence of the two readout beams at the beam splitter. Also it is apparent that the precise details of the gain tube and/or modulator may be varied without departing from the scope of the invention as hereinafter claimed.

I claim:

1. An optical readout system for a differential laser gyro comprising
   a solid block having a plurality of coplanar passages therein,
   a laser gain medium located in at least one of said passages for generating traveling optical waves,
   a plurality of mirrors fixedly mounted on the periphery of said block in the plane containing said laser gain medium and said passages for causing said traveling optical waves to traverse said block in a closed path in both clockwise and anticlockwise directions through said passages,
   a modulator element having plane parallel end faces located in an additional one of said passages in the path of said traveling optical waves, said modulator element being oriented so that a portion of said clockwise and said anticlockwise traveling waves are respectively reflected from opposite end faces thereof at a small angle relative to the plane of said traveling optical waves,
   first and second prism means mounted on the periphery of said block for intersecting the reflected portions of said clockwise and anticlockwise waves respectively and redirecting said reflected beam portions in a common plane,
   and beam splitter means fixedly mounted on said block in said common plane and adapted to produce from said reflected beam portions first and second colinear output beams.

2. A system as in claim 1 in which the portions of said clockwise and anticlockwise waves respectively reflected from opposite faces of said modulator element are each reflected in opposite directions having an orthogonal component relative to the plane of said traveling optical waves.

3. A system as in claim 1 in which said first and second prism means are so located on the periphery of said block and so oriented that the portions of said reflected clockwise and anticlockwise beams redirected in said common plane by said first and second prism means intersect coincidently at said beam splitter means.

4. A system as in claim 1 in which said plurality of passages are arranged in the form of a figure eight, and in which four mirrors are fixedly mounted on the periphery of said block, a first pair of said mirrors being located respectively at opposite ends of said modulator element, and a second pair of said mirrors being located respectively at opposite ends of said gain tube, each of said reflected clockwise and anticlockwise beam portions intersecting opposite ones of said first pair of mirrors and being reflected thereby respectively toward said first and second prism means.

5. A system as in claim 4 in which each of said first and second prism means is located on the periphery of said block immediately adjacent one of said second pair of mirrors.

6. A system as in claim 1 and including first and second optical detectors mounted on said block in the path of said first and second output beams respectively.

7. A system as in claim 1 in which said beam splitter is mounted in a spherical base, and said block contains a spherical seat adapted to receive said spherical base, said spherical base being adjustable relative to said spherical seat about three angular degrees of freedom.

8. A method for producing an output from a differential laser gyro, said gyro comprising a solid block having a plurality of coplanar passages therein in a figure eight configuration and a laser gain medium in one of said passages for producing clockwise and anticlockwise optical traveling waves which traverse said passages in a closed path, a plurality of mirrors being mounted on the periphery of said block and oriented to reflect said waves about said path, comprising the steps of inserting a modulator element in one of said passages, said modulator element having plane parallel end faces, orienting said modulator element so that a portion of each of the clockwise and anticlockwise traveling waves are reflected from opposite end faces thereof at a slight angle having a component orthogonal to the plane of said optical traveling waves, reflecting each of said reflected clockwise and anticlockwise waves from separate ones of said mirrors toward first and second prisms respectively, said prisms being mounted on the periphery of said block, and orienting said first and second prisms so that said reflected clockwise and anticlockwise waves coincide at a beam splitter mounted on said block.

9. The method as in claim 8 and including the step of orienting said beam splitter so that a first portion of said reflected clockwise and anticlockwise waves coincident thereon is reflected from said beam splitter, and a second portion of said reflected clockwise and anticlockwise waves coincident thereon passes through said beam splitter, said first and second portions being combined to produce first and second colinear output beams.

* * * * *